United States Patent [19]

Nakanose et al.

[11] Patent Number: 4,726,852
[45] Date of Patent: Feb. 23, 1988

[54] METHOD OF PRODUCING BOWL-LIKE METAL ARTICLE

[75] Inventors: Megumi Nakanose, Sagamihara; Yutaka Sohara, Tanashi; Hiroyuki Tanaka, Tokyo; Shinsaku Hamada, Osaka, all of Japan

[73] Assignee: Nissan Motor Co., Ltd., Japan

[21] Appl. No.: 890,559

[22] Filed: Jul. 30, 1986

[30] Foreign Application Priority Data

Aug. 5, 1985 [JP] Japan .................................. 60-172194

[51] Int. Cl.$^4$ ............................................... C21D 8/00
[52] U.S. Cl. ........................... 148/11.5 F; 148/127 B; 148/131
[58] Field of Search ....................... 148/11.5 F, 12.7 B, 148/11.5 R, 12 R, 12.7, 131, 133; 72/342

[56] References Cited

U.S. PATENT DOCUMENTS

| | | | |
|---|---|---|---|
| 539,089 | 5/1895 | Simonds | 266/117 |
| 1,595,725 | 8/1926 | Phillips | 266/118 |
| 4,376,662 | 3/1983 | Brimm | 148/131 |
| 4,469,530 | 9/1984 | Wyss et al. | 148/165 |

*Primary Examiner*—Christopher W. Brody
*Attorney, Agent, or Firm*—Leydig, Voit & Mayer

[57] ABSTRACT

The invention relates to a method of producing a bowl-like metal article, e.g. a half of a spherical rocket motor case made of a titanium alloy, by first shaping a flat blank into a bowl-like shape by a press forming operation and subsequently making heat treatment of the bowl-like work. Following the press forming operation, the shape of the bowl-like work is corrected by spinning. At the heat treatment a templet member is used to keep the bowl-like work in a restrained state so as to correct possible irregular straining and distortion of the work. Preferably the templet is a bowl-like member designed and disposed such that its outer surface comes into close contact with the inner surface of the bowl-like work by thermal expansion at the heat treatment. Both the thickness of the blank and the amount of machining on the heat-treated work can be reduced.

8 Claims, 16 Drawing Figures

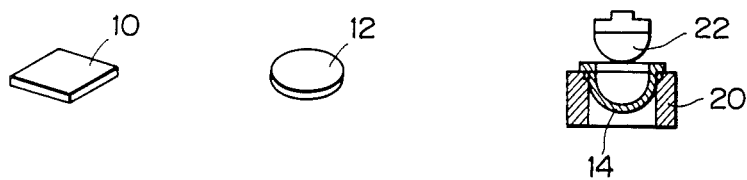
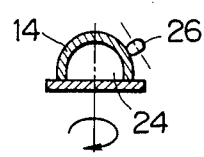
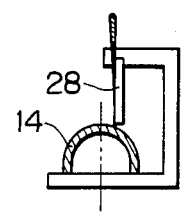
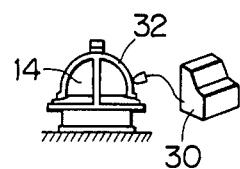
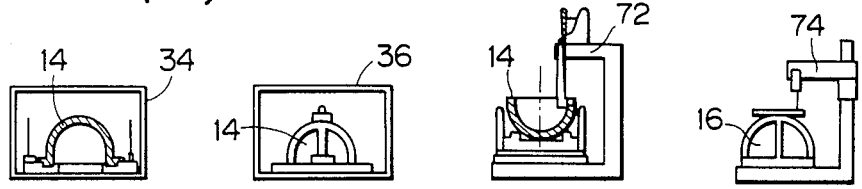
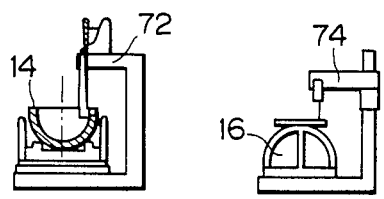
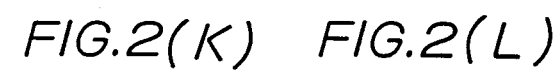
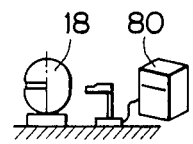
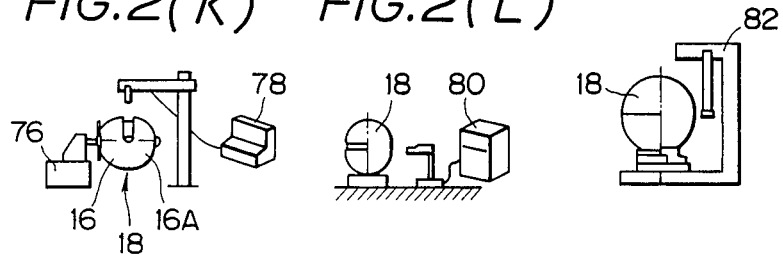

METHOD OF PRODUCING BOWL-LIKE METAL ARTICLE

BACKGROUND OF THE INVENTION

This invention relates to a method of producing a generally hemispherical bowl-like metal article such as, for example, a hollow hemispherical part of a pressure vessel or a rocket motor case. The metal material may be one that is inferior in formability, such as titanium or its alloy, and heat treatment of the bowl-like article is essential.

In many cases vessel-like metal structures such as pressure vessels and rocket motor cases have generally hemispherical or bowl-like parts. For example, a spherical pressure vessel or rocket motor case is usually produced by butt welding of two hemispherical parts along the equatorial edges, and in producing a cigar-like pressure vessel or rocket motor case a hemispherical part is welded at its equatorial edge to an open end of a cylindrical part. Recently such hemispherical parts are often made of titanium or its alloy which is superior in specific strength but is inferior in formability.

A typical conventional method of producing a spherical rocket motor case of a titanium alloy includes the following steps. A relatively thick plate of the titanium alloy is cut into a flat and circular blank, and the blank is drawn into a bowl-like shape by a hot press forming operation. In many cases some external parts are welded to the bowl-like work preceded by some preparatory machining operations. Next, the bowl-like work is subjected to a solution heat treatment and then to an age-hardening treatment. After that machining is made on the outer and inner surfaces of the bowl-like work until the wall thickness becomes as prescribed. The hemispherical part obtained through these steps is brought into abutment with another hemispherical part prepared in the same way, and the two parts are welded together to thereby obtain a spherical case. Sometimes the hemispherical parts are formed by forging instead of the aforementioned hot press forming.

The above described conventional method is not high in productivity and entails high material and labor costs. Because of inferior formability of the employed metal material it is impossible to accomplish the initial press forming operation with desirably high precision in the shape and dimensions of the hemispherically shaped work. Accordingly it is necessary to use a considerably thick blank compared with the wall thickness of the final product in order to allow redressing of irregularities by subsequent machining. Furthermore, oxide layers are formed on the surfaces of the hemispherical work which is exposed to the atmosphere during the heat treatment, and, besides, the work is liable to undergo some distortion during the heat treatment. For these reasons a considerable amount of the metal material must be removed from the heat-treated hemispherical work by machining on the outer and inner sides.

SUMMARY OF THE INVENTION

It is an object of the present invention to provide an improved method of producing a generally hemispherical bowl-like metal article, which method is applicable to titanium and other metal materials rather inferior in formability and by which method both the thickness of the blank and the amount of labor for attaining required accuracy in the shape and dimensions of the product can be reduced.

To accomplish the above object a method according to the invention comprises the steps of shaping a metal blank in the form of a circular plate into a bowl-like member by a press forming operation, correcting the shape of the bowl-like member by a spinning operation, and, after the spinning operation, subjecting the bowl-like member to a heat treatment by using a jig means comprising a templet member which keeps the bowl-like member in a restrained state so as to correct possible irregular straining and distortion of the bowl-like member under heat treatment.

According to the invention the metal material is formed into a bowl-like shape by a combination of a press forming operation and a subsequent spinning operation which is performed precedent to heat treatment of the work. By doing so it is possible to obtain a more accurately shaped bowl-like member than in the case of relying exclusively on press forming.

Another important feature of the method according to the invention is keeping the bowl-like member under heat treatment in a restrained state so as to correct possible irregular straining or distortion of the bowl-like member. As a preferred example, the templet member of the aforementioned jig means is a bowl-like body which has an outer surface shaped correspondingly to the inner surface of the bowl-like work and is made of a material having an coefficient of expansion greater than that of the material of the bowl like work. At the heat treatment the templet member is held inside the bowl-like work such that the outer surface of the templet member is initially spaced slightly from the inner surface of the work and comes into contact with said inner surface as the work and the templet member is heated together. An inactive gas is introduced into the initial space between the work and the templet member to prevent oxidation of the inner surface of the work. Strains produced in the bowl-like work under heating are remedied by the action of the moderately expansionary force attributed to the thermal expansion of the templet member in close contact with the inner surface of the bowl-like work, and the work is prevented from being distorted by the heat treatment.

Preferably the templet member is designed such that, when the heated bowl-like work and templet member are cooled together, the templet member is lower in the rate of cooling than the work. The so designed templet member can continue restraining the work even at the cooling stage of the heat treatment operation.

By the method according to the invention thermal strains in the heat-treated work can be substantially decreased. Furthermore, oxidation of the inner surface of the work is effectively prevented. Therefore, in many cases machining of the inner surface of the heat-treated work can be omitted. For these reasons, dimensional changes of the bowl-like work by heat treatment are remarkably decreased and machining operations after heat treatment are very lessened and lightened. Therefore, it is possible to reduce the initial wall thickness of the bowl-like work and, hence, the thickness of the blank in the press forming operation.

As the thickness of the blank can be reduced, the press forming operation does not necessarily have to be a hot press forming operation. In many cases it is possible to accomplish the object by warm press forming or cold press forming. In the case of hot press forming, the surfaces of the shaped work need to be ground by a suitable method such as buffing. When cold press forming is employed such a grinding operation is not indispensable because the surfaces of the work are scarcely oxidized or nitrified and remain in a clean, smooth and healthy state.

Thus, the present invention makes it possible to decrease both the waste of the metal material and the man-hours for machining operations considerably. In other words, bowl-like metal articles can be produced with improved precision and reduced costs even though the metal material is inferior in formability as in the case of titanium or its alloy. For example, this invention is very useful in producing bowl-like or generally hemispherical parts of pressure vessels or rocket motor cases. dr

BRIEF DESCRIPTION OF THE DRAWINGS

FIGS. 2(A) to 2(M) illustrate the steps of the process shown in FIG. 1;

DESCRIPTION OF THE PREFERRED EMBODIMENTS

Figure 1:
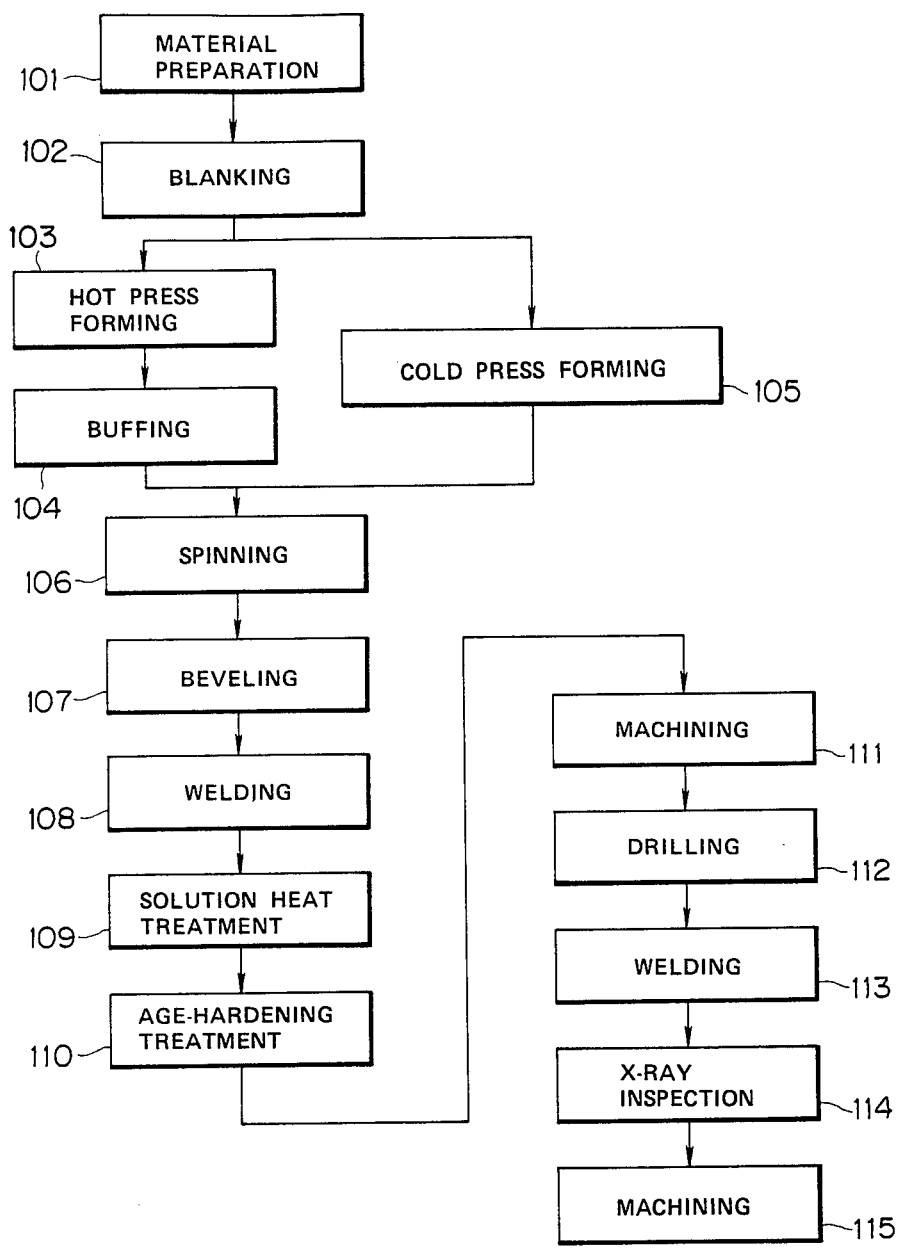
FIG. 1 is a flow chart showing the process of producing a spherical rocket motor case by using a method according to the invention.

In the present invention, forming of a metal blank into a bowl-like shape is accomplished primarily by press forming and is completed by spinning. The type of the spinning operation is not limited. That is, the spinning operation may be either so-called conventional spinning in which the work is shaped with little change in its thickness or shear spinning an which the work is shaped while its thickness changes. In either case the spinning operation may be carried out by constraining the work between a profiling die and a roller (or a round-ended tool) or rollers (or round-ended tools) or by constraining the work between a roller (or a round-ended tool) and another roller (or a round-ended tool). In any case the spinning operation may be hot spinning, warm spinning or cold spinning. According to the need the spinning operation may be followed by a surface grinding operation such as buffing.

In the present invention the type of the heat treatment is not limited. For example, solution heat treatment and age-hardening treatment may be made at usual temperatures and for usual periods when the metal material is titanium, a titanium alloy, an austenite stainless steel or a precipiration hardened stainless steel, whereas hardenign and annealing treatment may be made when the metal material is a martensite stainless steel.

FIG. 1 and FIGS. 2(A) to 2(M) illustrate the flow of operations in producing a spherical rocket motor case by using a method according to the invention.

The initial step 101 is preparing a rectangular or belt-like plate 10 of a titanium alloy shown in FIG. 2(A). At step 102 a circular blank 12 shown in FIG. 2(B) is obtained from the titanium plate 10 by a usual blanking operation.

At step 103, as shown in FIG. 2(C), the circular blank 12 is shaped into a generally hemispherical bowl-like member 14 by a hot press forming operation using a die 20 and a punch 22. In most cases the hot press forming is carried out in several stages by repeating the sequence of heating the blank and pressing the heated blank. At the subsequent step 104 the outer and inner surfaces of the bowl like work 14 are ground, for example, by a buffing operation. Alternatively, and particularly when the blank 12 is relatively thin, shaping of the blank 12 into the bowl-like member 14 may be accomplished by cold press forming (step 105) using a die and a punch similar to the ones used at the hot press forming step 103. Still alternatively the step 105 may be a warm press forming operation. According to the need the cold or warm press forming operation may be carried out in several stages.

Figure 3:
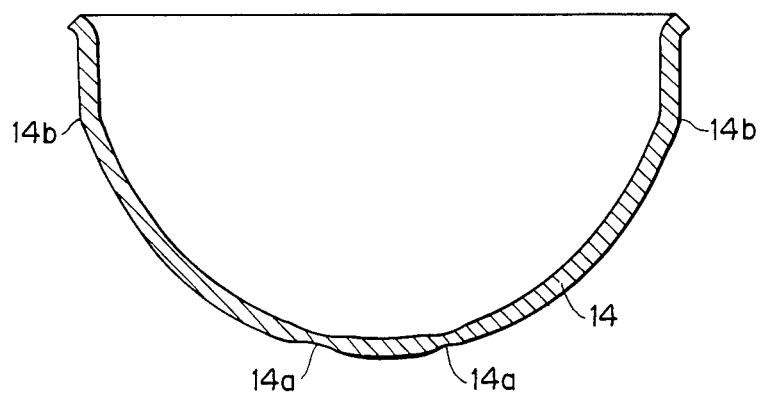
FIG. 3 is an elevational sectional view of a bowl-like member which is obtained at the press forming step in the process of FIG. 1 and is to be processed for correcting irregularities.

In practice it is almost inevitable that the bowl-like member 14 obtained by a press forming method has, as illustrated in FIG. 3, irregularly thickness reduced regions 14a and/or outwardly expanded regions 14b. The appearance of such irregularities is very significant when the press forming operation at step 103 or 105 is carried out in several stages. Anyhow, it is difficult to obtain the bowl-like member 14 with uniform thickness and with very accurate circularity or roundness.

According to the invention the shape of the bowl-like member or work 14 is corrected by a spinning operation at step 106. As illustrated in FIG. 2(D), the bowl-like work 14 is placed its open end down on a generally hemispherical male die 24, and a roller (or a round-ended tool) 26 is pressed against the outer surface of the work 14. The spinning operation may be hot spinning, warm spinning or cold spinning, and may be either conventional spinning or shear spinning. When suitable it is optional to use two rollers or round-ended tools (26) in the spinning operation.

Where necessary, heat treatment of the thus shaped bowl-like work 14 is preceded by a welding process to attach an external part, or external parts, to the outer surface of the work 14. At step 107 illustrated in FIG. 2(E), the outer surface of the bowl-like work 14 is machined with a suitable cuttinq machine 28 to form bevels to be used in the welding operation. At step 108 illustrated in FIG. 2(F), an external part 32 is welded to the bowl-like work 14 by using a conventional welder 30.

At the next step 109, FIG. 2(G), the bowl-like work 14 is subjected to a solution heat treatment in a heat treatment chamber 34. (The welded external part is omitted from illustration.) For example, the bowl-like work 14 is heated at a temperature in the range from 800° to 850° C. for a predetermined time and then cooled rapidly by immersion into a water tank (not shown). During the heating and cooling process the bowl-like work 14 is kept in a restrained state so that possible strains and distortion may be corrected. For example, a heat treatment jig unit as shown in FIG. 4 is used to keep the work 14 in such a restrained state.

Figure 4:
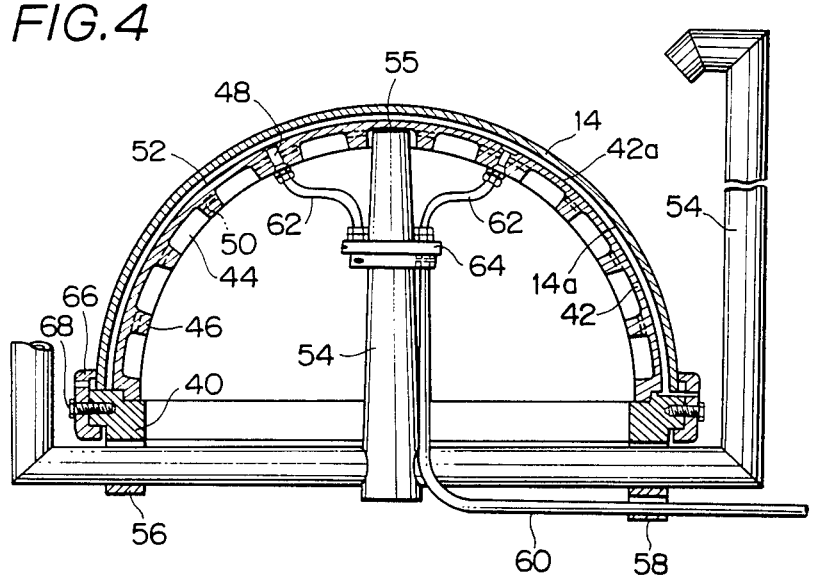
FIG. 4 is a vertical sectional view of a heat treatment jig unit which can be used in a method according to the invention.

Essentially the heat treatment jig unit of FIG. 4 consists of an annular base 40 on which the bowl-like 14 is placed, a generally hemispherical and hollow metal templet 42 which is secured to the base 40 and has an outer surface 42a shaped correspondingly to the generally hemispherical inner surface 14a of the work 14, an exhaust duct 54 which has an inlet opening 55 located near the polar region of the hemispherical templet 42, and a gas feed pipe 60 to introduce an inactive gas into a narrow space 52 between the outer surface 42a of the templet 42 and the inner surface 14a of the work 14.

The hemispherical templet 42 has an outer diameter slightly smaller than the inner diameter of the bowl-like work 14. The material of this templet 42 must be greater in the coefficient of expansion than the material of the work 14. For example, when the work 14 is formed of a titanium alloy having a linear coefficient of expansion of about $9.7 \times 10^{-6}/°C.$, an austenite stainless steel having a linear coefficient of expansion of about $18.0 \times 10^6/°C.$ can be used as the material of the templet 42. On the radially inner side the hemispherical templet 42 is formed with a number of grooves 44 so as to leave a number of reinforcing rib-like projections 46. The grooves 44 serve the purpose of enhancing the rate of cooling of the work 14 after its heating together with the templet 42. Using a few of the rib-like projections 46 the templet 42 is formed with through-holes 48 for introducing the aforementioned inactive gas into the space 52. Besides, the templet 42 is formed with gas passages 50 through which either air or inactive gas is discharged. The templet 42 has a sufficiently large mass so that the work 14 may be cooled more rapidly than the templet 42 at the cooling stage of the heat treatment.

The exhaust duct 54 is supported at its horizontal sections by brackets 56 and 58 fixed to the base 40. Outside the templet 42 the exhaust duct 54 has outlets positioned higher than the top of the templet 42. The gas feed pipe 60 is supported by the bracket 58 and extends to a junction device 64 which is fastened to the central vertical section of the exhaust duct 54 and in which the pipe 60 branches into a plurality of conduits 62 which extend to and connect with the aforementioned through-holes 48 in the templet 42, respectively.

Preferably a suitable ceramic powder such as boron nitride powder is applied, as a diffusion bonding inhibitor, to the outer surface 42a of the hemispherical templet 42. After that the bowl-like work 14 is placed on the annular base 40 so as to coaxially enclose the templet 42 and is fixed to the base 40 by using clamp plates 66 and bolts 68. In that state the jig unit supporting thereon the work 14 is transferred into the solution heat treatment chamber 34 in FIG. 2(G). Then an inactive gas such as argon is introduced into the space 52 between the inner surface 14a of the work 14 and the outer surface 42a of the templet 42. Continuing the feed of the inactive gas, the work 14 is heated up to the predetermined heat treatment temperature and kept at that temperature for a predetermined time. Naturally the templet 42 too is heated to the same temperature. Since the coefficient of expansion of the templet 42 is greater than that of the work 14, thermal expansion of the templet 42 results in close and compressive contact of the outer surface 42a of the templet with the inner surface 14a of the work. In such a state the templet 42 serves as a restraining member which restrains the work 14 from irregularly straining and being distorted.

After completion of the intended heating operation the jig unit supporting thereon the work 14 is taken out of the heat treatment chamber 34 and, together with the work 14, is subjected to rapid cooling or quenching by, for example, immersion in a water tank (not shown). Since the templet 42 is so designed as to be lower in the rate of cooling than the work 14, the work 14 remains in contact with or, rather, makes further intimate contact with the outer surface 42a of the templet 42 during the cooling process. Therefore, local strains in the work 14, if any, are effectively remedied and the work 14 can retain its exact shape.

Next, at step 110 the bowl-like work 14 held on the heat treatment jig unit of FIG. 4 is subjected to an age-hardening treatment in a chamber 36 illustrated in FIG. 2(H). While an inactive gas such as argon gas is fed through the pipe 60 into the space 52 between the work 14 and the templet 42, the work 14 is heated to a predetermined age-hardening treatment temperature, e.g. to 495° C., and is maintained at that temperature for a predetermined time, e.g. for 14 hr. Naturally the templet 14 too is heated at the same temperature. After completion of the age-hardening treatment the bowl-like work 14 is detached from the heat treatment jig. The work 14 can be separated from the templet 42 without difficulty since the diffusion bonding inhibitor is applied to the outer surface 42 of the templet in advance. It is optional to exchange the heat treatment jig unit used in the solution heat treatment at step 109 for another heat treatment jig unit of similar construction in performing the age-hardening treatment at step 110.

The heat-treated bowl-like work 14 is very little in thermal strains, and the inner surface 14a remains in very good and healthy state since this surface does not contact with the atmosphere during the heating operations.

The subsequent steps 111–115 are all conventional operations. Step 111 illustrated in FIG. 2(I) is machining the heat-treated bowl-like work 14 with a milling machine 72 to finish the shape of the work 14 and to reduce the wall thickness of the work 14 to a predetermined thickness. As the result the work 14 turns into a generally hemispherical part of a generally spherical rocket motor case. The next step 112 illustrated in FIG. 2(J) is drilling the hemispherical part 16 with a drilling machine 74 to bore holes at prescribed locations. At step 113 illustrated in FIG. 2(K), the hemispherical part 16 is mounted on a turn-table 76 and is fixed to another hemispherical part 16A by butt welding along the equatorial edges of the two hemispherical parts using a conventional welder 78. That is, the two parts 16 and 16A are united into a generally spherical rocket motor case 18. Step 114 illustrated in FIG. 2(L) is inspecting the spherical case 18 with an X-ray inspection apparatus 80. The final step 115 illustrated in FIG. 2(M) is machining the spherical case 18 mostly in its weld joint region with a lathing or milling machine 82.

What is claimed is:

1. A method of producing a bowl-like metal article, comprising the steps of:
    shaping a metal blank in the form of a circular plate into a bowl-like member having a concave inner surface and an open end by a press forming operation;
    correcting the shape of said bowl-like member by a spinning operation;
    after the shape correcting step, securing said bowl-like member in a region near the open end to a transferable annular base support means;
    securing a templet member, having a convex outer surface shaped to correspond to said concave inner surface of said bowl-like member and formed of material having a coefficient of expansion greater than the coefficient of expansion of the material of said bowl-like member and made such that when said bowl-like member and said templet member are cooled together from an elevated temperature said templet member will cool at a lower rate than said bowl-like member, to said support means so that said convex outer surface of said templet member is initially at such a short distance from said concave inner surface of said bowl-like member that when said bowl-like member and said templet member are heated to a predetermined temperature said convex outer surface comes into contact with said concave inner surface of said bowl-like member by thermal expansion;

heating said bowl-like member together with said templet member while they are secured to said support means to a heat treatment temperature which is an elevated temperature not lower than the predetermined temperature, to keep said bowl-like member in a restrained state and correct irregular straining and distortion of said bowl-like member under heat treatment; and rapidly cooling the heated bowl-like member together with said templet member while said convex outer surface of said templet member is still in contact with said concave inner surface of said bowl-like member.

2. A method according to claim 1, wherein said press forming operation is hot press forming operation.

3. A method according to claim 1 further comprising the step of grinding the surfaces of said bowl-like member precedent to the shape correcting step.

4. A method according to claim 1, wherein said press forming operation is cold press forming operation.

5. A method according to claim 1, wherein an inactive gas is introduced into the space between said outer surface of said templet member and the inner surface of said bowl-like member.

6. A method according to claim 1, wherein a diffusion bonding inhibitor is applied to said outer surface of said templet member.

7. A method acccording to claim 1, wherein said metal is titanium or a titanium alloy.

8. A method according to claim 1, wherein said bowl-like metal article is a part of a rocket motor case.

* * * * *